Dec. 31, 1957   F. TH. ROLLER   2,818,140
WHEEL BRAKE SUPPORT
Filed Sept. 29, 1953

INVENTOR
FRANZ TH. ROLLER.

BY  *Dicks and Craig.*

ATTORNEYS.

United States Patent Office 2,818,140
Patented Dec. 31, 1957

2,818,140

WHEEL BRAKE SUPPORT

Franz Th. Roller, Stuttgart, Germany, assignor to Daimler-Benz Aktiengesellschaft, Stuttgart-Unterturkheim, Germany Application September 29, 1953, Serial No. 383,039

Claims priority, application Germany October 2, 1952

2 Claims. (Cl. 188—78)

This invention relates to a shoe brake, more particularly of the type of an interior shoe brake actuated in a hydraulic way. A main object of this invention is to support the brake shoe or the anchor bolt supporting said brake shoe on the brake backing plate of shoe brakes in a rigid manner and not subject to bending or oscillating movements.

Accordingly a characteristic feature of the present invention consists in the fact that the supporting or anchor bolt of the brake shoe is supported on both sides thereof on supporting members, especially on a brake backing plate and an additional disc-shaped supporting member arranged substantially parallel to the brake backing plate. From such a construction results the advantage that the forces of the brake shoes are apportioned between two supporting surfaces of the anchor bolt.

A further object of the present invention is to connect the additional supporting disc-shaped member to the brake backing plate at a place, at which the latter is very stiff. This is mostly the case on or adjacent to a hub-like member of the brake backing plate. For bridging the distance necessary for receiving the brake shoe supports it is suitable to distinctly develop said hub by means of a tube like extension and to secure thereat the additional supporting disc-shaped member.

According to a further feature of the present invention the additional supporting disc-like member is made of a metal sheet which is provided with a projection, for instance, by means of pressure, and which corresponds to the diameter of the hub of the brake backing plate, being welded, more particularly blunt welded to said hub so that the additional supporting disc-shaped member effectively forms one piece with the brake backing plate.

In the drawing, which represents one embodiment of the invention,

Figure 1:
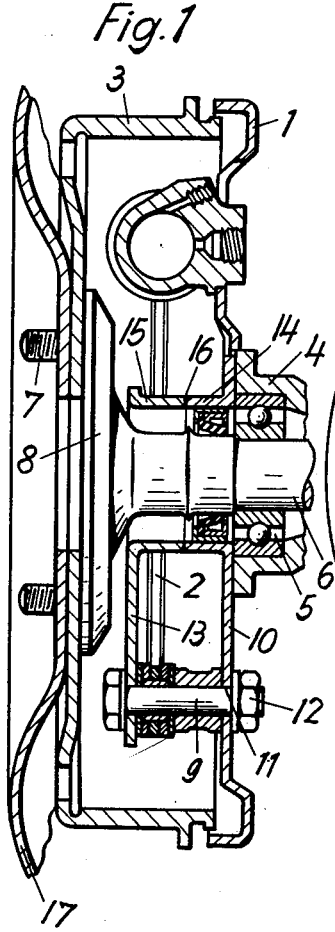
Fig. 1 shows a cross-section through a shoe brake.
Figure 2:
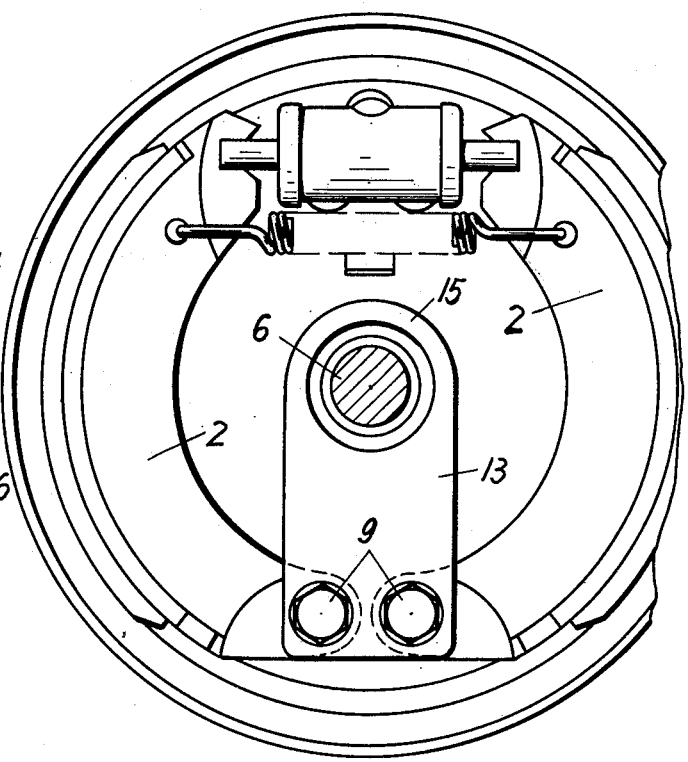
Fig. 2 shows a right-hand side view of Figure 1.

The shoe brake of a motor vehicle comprises a brake backing plate, a brake shoe 2 and a brake drum 3. The brake backing plate 1 is secured to an axle casing 4 supporting the axle shaft 6 by means of a ball bearing 5. By means of screws 7 the wheel body 17 and the brake drum 3 are fixed to a flange 8 of the axle shaft 6. Screw or anchor bolts 9 are provided for supporting the brake shoes. The anchor bolts 9 are supported at one end thereof in the central part 10 of the brake backing plate, each bolt 9, for instance, extending through a bore 11 and being retained in place by a nut 12. The other end of each bolt 9 rests in a disc-shaped supporting member 13, which is suitably provided with a tube-like projection 15 corresponding to the hub part 14 of the brake backing plate 1. The projection 15 is rigidly connected to the hub 14 of the brake backing plate as at 16 by means of blunt welding so as to form one unit therewith.

Bolts supported according to this invention will not be displaced even under most extreme conditions. More particularly such a support is so rigid, that neither the bolts nor the brake backing plate will tend to produce vibrations during a braking action, which may result in the well known phenomenon of creaking brakes.

The present invention is of course, not restricted to the embodiment as set forth. For instance, this invention may also apply to such shoe brakes, in which two brake shoes are supported on one bolt only.

What I claim is:

1. In combination with a vehicle wheel, a driving shaft driving said wheel, an axle casing surrounding said shaft and having an open end towards said wheel, a shoe-type brake for said wheel comprising a rotatable brake drum open at one side thereof and fastened onto said shaft, a brake shoe within said brake drum, a relatively stationary sheet-metal brake backing plate member enclosing said one side of said brake drum and fastened to said open end of said axle casing, an anchor bolt for supporting said brake shoe and fastened at one end thereof at said brake backing plate member, a relatively stationary disk-shaped member for securing therein the other end of said anchor bolt, said second member being rigidly secured to said backing plate member and being spaced therefrom in parallel relation therewith for providing a space between said backing plate member and said second member, said backing plate member and said disk-shaped member each having a hub-like portion, each said hub-like portion having an axially extending tube-like projection having a free end, said free end of each said hub-like portion being blunt-welded to each other axially, and said brake shoe being supported on said anchor bolt within said space.

2. In combination with a vehicle wheel, a driving shaft driving said wheel, an axle casing surrounding said shaft and having an open end towards said wheel, a shoe-type brake for said wheel comprising a rotatable brake drum open at one side thereof and fastened onto said shaft, a brake shoe within said brake drum, a relatively stationary sheet-metal brake backing plate member enclosing said one side of said brake drum and fastened to said open end of said axle casing, an anchor bolt for supporting said brake shoe and fastened at one end thereof at said brake backing plate member, a relatively stationary disk-shaped member for securing therein the other end of said anchor bolt, said second member being rigidly secured to said backing plate member and being spaced therefrom in parallel relation therewith for providing a space between said backing plate member and said second member, at least one of said backing plate member and said disk-shaped member having an axially extending tube-like projection, said backing plate member and said disk-shaped member being welded together at the free end of said tube-like projection, and said brake shoe being supported on said anchor bolt within said space.

References Cited in the file of this patent

UNITED STATES PATENTS

| 2,626,684 | Lauer | Jan. 27, 1953 |

FOREIGN PATENTS

| 864,832 | France | Feb. 3, 1941 |
| 445,714 | Italy | Feb. 24, 1949 |